United States Patent [19]

Westveer

[11] 4,408,453

[45] * Oct. 11, 1983

[54] HYDRAULIC CONTROL SYSTEM

[75] Inventor: Robert C. Westveer, Kalamazoo, Mich.

[73] Assignee: General Signal Corporation, Stamford, Conn.

[ * ] Notice: The portion of the term of this patent subsequent to Apr. 15, 1997 has been disclaimed.

[21] Appl. No.: 225,815

[22] Filed: Jan. 16, 1981

[51] Int. Cl.³ .............................................. F16H 39/46

[52] U.S. Cl. ....................................... 60/445; 417/218

[58] Field of Search ......................... 60/445, 447, 449; 417/48

[56] References Cited

U.S. PATENT DOCUMENTS

| | | | |
|---|---|---|---|
| 3,777,492 | 12/1973 | Boydell et al. | 60/445 |
| 3,788,077 | 1/1974 | Johnson et al. | 60/452 |
| 3,947,194 | 3/1976 | Schlecht | 60/447 |
| 3,963,378 | 6/1976 | McMillian | 60/447 |
| 4,047,590 | 9/1977 | Hoashi et al. | 60/447 |
| 4,067,193 | 1/1978 | Norick | 60/445 |
| 4,168,612 | 9/1979 | Nikolaus | 60/447 |
| 4,197,705 | 4/1980 | Westveer | 60/445 |
| 4,216,656 | 8/1980 | Hamma | 60/447 |

*Primary Examiner*—George L. Walton

*Attorney, Agent, or Firm*—Pollock, Vande Sande & Priddy

[57] ABSTRACT

An hydraulic control system is disclosed which comprises a fluid reservoir (14), a variable displacement pump (12) having a fluid input connected to the reservoir and a fluid output, and a fluid pressure actuated displacement of the pump. A control valve (18) is connected to the fluid output of the variable displacement pump and to the reservoir and is adapted to control the flow of fluid to a fluid actuated device. The control valve includes means (44, 50, 52, 54, 56) for regulating flow of a signal fluid provided either by a constant displacement pump (46) or a pressure actuated flow control valve (47). A sensor valve (58) is placed in fluid communication with the signal fluid, the displacement control mechanism, and the reservoir for placing the signal fluid in communication with the displacement control mechanism or for placing the displacement control mechanism in communication with the reservoir, in response to changes in the pressure of the signal fluid, thereby controlling the displacement of the pump in response to the magnitude of the pressure of the signal fluid.

7 Claims, 2 Drawing Figures

HYDRAULIC CONTROL SYSTEM

DESCRIPTION

1. Technical Field

The invention concerns an hydraulic control system for distributing fluid to a plurality of fluid actuated devices. More particularly, the invention concerns an improvement in the hydraulic control system disclosed in my U.S. Pat. No. 4,197,705 issued Apr. 15, 1980, the disclosure of which is hereby expressly incorporated by reference into this application.

2. Background Art

It is frequently necessary for a single hydraulic pump to provide hydraulic fluid at sufficient pressure and flow rate to operate a plurality of fluid actuated devices. For many years fixed displacement pumps have been used in combination with open center control valves to distribute the fluid to the desired fluid actuated device. When the control valve was placed in its neutral position, providing no distribution of fluid to the fluid actuated devices, such systems were subjected to excessive flow pressure, power losses and heat dissipation problems. Additionally, when the fluid actuated devices required only a portion of the pump's fixed displacement, the remainder of the pump flow and considerable power were wasted.

To overcome these difficulties variable displacement pumps were adopted in combination with closed center control valves to achieve better system efficiency. In some applications the variable displacement pumps were provided with pressure compensated controls so that the pump idles at maximum system pressure. As a result, the control valve was required to meter down to the actual load pressure, which often caused a very large pressure drop across the valve. Such large pressure drops were a very inefficient use of energy.

In other applications, variable displacement pumps in combination with a closed center control valve were used in a load sensitive system. Such a system included a flow demand control valve for sensing the differential pressure between the pump inlet and some controlled point in the fluid supply to the load. Such load sensitive systems had the disadvantage of being quite complex and therefore expensive to manufacture. Also, such load sensitive systems could be "fooled" if a load was being lowered with the aid of the force of gravity. Under these circumstances the load signal might reverse, resulting in diminished pump output rather than the desired increase in pump output.

Many of the aforementioned problems have been solved by the type of control system disclosed in U.S. Pat. No. 3,788,077 issued to Johnson, et al. This patent discloses a hydraulic control system for a variable displacement pump, including a standard open center type of control valve with a standard fluid actuated displacement control mechanism for the pump. A control pressure signal indicative of pump output pressure is developed in the control valve and this control pressure signal is used to control the position of a sensor valve. The sensor valve in turn controls communication between the pump and the displacement control mechanism and communication between the displacement control mechanism and a reservoir. Systems of this type have generally lacked the responsiveness required for the control of many fluid actuated devices.

DISCLOSURE OF THE INVENTION

An object of the present invention is to provide a hydraulic control system capable of controlling the distribution of fluid to a plurality of fluid actuated devices in a highly efficient and responsive manner.

Another object of the present invention is to provide such a hydraulic control system which is not subject to signal reversals as a result of gravitational forces acting on the fluid actuated devices.

A further object of the present invention is to provide a hydraulic control system for a variable displacement pump which requires the use of only a single control line to the pump.

A further object of the present invention is to provide a hydraulic control system for a variable displacement pump which includes a control valve that develops a control pressure signal for the pump which is responsive to the position of individual valve plungers.

Still another object of the present invention is to provide a hydraulic control system for a variable displacement pump which includes an improved displacement control mechanism for the pump.

Yet another object of the present invention is to provide a hydraulic control system for a variable displacement pump which may be easily manufactured by making relatively simple and inexpensive modifications to existing control systems.

The above objects of this invention are given only by way of example; therefore, other desirable objectives and advantages inherently achieved by the disclosed structure may occur or become apparent to those skilled in the art. Nonetheless, the scope of the invention is to be limited only by the appended claims.

In a preferred embodiment of the invention, the hydraulic control system comprises a fluid reservoir and a variable displacement pump having a fluid input connected to the reservoir and a fluid output connected to a control valve. A fluid pressure actuated displacement control means is provided for controlling the displacement of the pump. The control valve means is in communication both with the output of the pump and with the reservoir, for controlling flow of fluid from the pump to various pressure actuated devices. Means such as a constant displacement pump or a pressure compensated flow control valve are provided for producing a constant flow of signal fluid and means including the control valve are provided for regulating the flow of this signal fluid. A sensor valve is located in fluid communication with the output of the regulating means, with the displacement control means and with the reservoir, for the purpose of directing a portion of the signal fluid to the control means or for placing the control means in communication with the reservoir, all in response to variations in the pressure of the signal fluid. Thus, the displacement of the pump is controlled. Because a separate means for producing a constant flow of signal fluid is included, the flow of signal fluid is independent of the back pressures acting on the control valve.

BEST MODE FOR CARRYING OUT THE INVENTION

Figure 1:
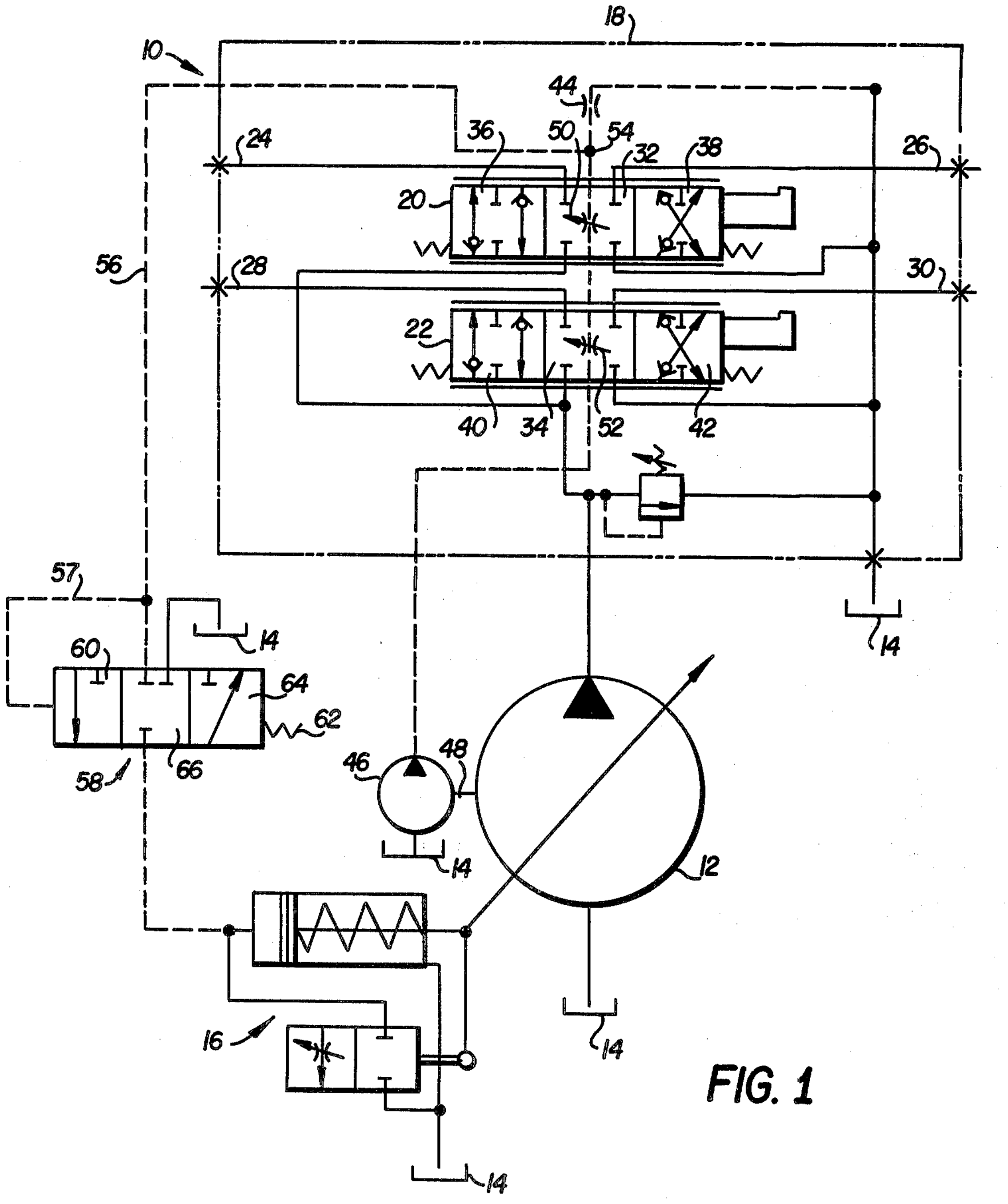
FIG. 1 is a graphic diagram of a first embodiment of the hydraulic control system of the present invention.

Referring to FIG. 1, a hydraulic control system 10 is provided for controlling the distribution of fluid to a plurality of fluid actuated devices (not shown). A variable displacement pump 12 has its fluid input connected to a reservoir 14. Pump 12 is provided with a fluid actuated mechanism 16 for controlling its displacement. Control valve 18 including a plurality of plungers 20, 22 receives the fluid output of pump 12 and controls the flow of fluid to a reservoir 14, a plurality of fluid actuated devices (not shown) or both, by connecting the devices to a plurality of service ports 24, 26, 28 and 30. Each of plungers 20, 22 includes a neutral position 32, 34, respectively, in which fluid communication is blocked between lump 12 and service ports 24, 26, 28 and 30. Each of plungers 20, 22 also includes a pair of operating positions 36, 38 and 40, 42, respectively, for placing the output of pump 12 in fluid communication with a service port.

Control valve 18 further comprises means for developing and regulating a control pressure signal including a fixed orifice 44 for restricting flow from a constant displacement pump 46, preferably driven by the shaft 48 of pump 12, to reservoir 14. Each of the plungers 20, 22 further includes means graphically illustrated as variable orifices 50, 52, respectively, for restricting flow in the flow path between pump 46 and fixed orifice 44, when plungers 20, 22 are between their neutral positions 32, 34 and one of their operating positions. Flow restricting means 50, 52 provide a variable restriction in the flow path as plungers 20, 22 are moved from their neutral positions toward one of the operating positions, as shown in detail in my U.S. Pat. No. 4,197,705. Although only two plungers are illustrated, any suitable number of plungers may be used in accordance with the principles of the present invention. A control pressure signal is developed by positioning a control pressure port 54 between flow restricting means 50 and fixed orifice 44. The control pressure signal is then delivered along line 56 to a sensor valve 58. Because the flow past port 54 and through orifices 44 is drawn from reservoir 14 in parallel with the flow from pump 12, it is substantially isolated from any flow reversals or pressure surges imposed on service ports 24, 26 and 28, 30 by the associated fluid actuated devices. As a result, the control pressure signal on line 56 is responsive to the position of plungers 20, 22.

Sensor valve 58 is in fluid communication with a piston actuated displacement control mechanism 16 and reservoir 14, and includes three operating positions. The control signal pressure in line 56 acts through pilot line 57 to bias valve 58 toward a first operating position 60 in which line 56 is placed in fluid communication with displacement control mechanism 16. Should the control signal pressure apply a lower bias to the sensor valve 58 than a spring 62, the valve is spring biased into a second operating position 64 in which control mechanism 16 is placed in fluid communication with reservoir 14. Should the control signal pressure apply a bias equal the spring bias, the valve will be placed in a neutral position 66 for blocking fluid communication among line 56, control mechanism 16, and reservoir 14.

Under typical operating conditions of the hydraulic control system of the present invention, each pair of service ports 24, 26 and 28, 30, respectively, is connected to a fluid actuated device (not shown). With the system in a quiescent state and valve 18 is in its center or neutral position, a prime mover (not shown), is started to drive pumps 12 and 46. Control mechanism 16 is spring biased to full displacement so that pump 12 is in stroke when it is started. Pump 12 thus delivers an output to the input port of control valve 18. The constant output of pump 46 passes through the retrictions 50, 52 to fixed orifice 44. A limited amount of flow then passes from fixed orifice 44 to reservoir 14. However, when flow reaches the orifice 44, pressure rises and is transmitted by means of port 54 and control signal line 56 to sensor valve 58. When enough pressure builds up to overcome the bias of spring 62, sensor valve 58 is shifted into position 60. Line 56 is then placed in fluid communication with control mechanism 16 to reduce the output of pump 12 to a minimal level. Typically, pump output flow will be reduced to approximately 1 gpm and pump output pressure will be reduced to approximately 300 psi.

In this preferred embodiment the valve plungers 20, 22 are connected in a parallel configuration such that both plungers are always in fluid communication with pump 12. Should be operator displace one of the plungers by a small amount so as to meter a relatively small amount of fluid to one of the service ports, the signal flow through restrictions 50, 52 is reduced. This reduced flow generates a lower pressure at port 54 which in turn reduces the pressure bias applied to valve 58. When the pressure bias drops below that applied in the opposite direction by spring 68, sensor valve 58 shifts to position 64 permitting flow from control mechanism 16 to reservoir 14. The spring bias of the displacement control mechanism 16 will increase the displacement of pump 12 until the pressure build up at port 54 is sufficient to bias valve 58 out of position 64. Thus, should the operator meter a small amount of fluid to a fluid actuated device, pump displacement will increase to an amount intermediate minimum and maximum flow until an equilibrium condition is reached.

When either of plungers 20, 22 is fully actuated to one of its operating positions, all flow to port 54 is stopped by closure of one of restrictors 50, 52; and thus, the pressure at port 54 drops greatly. Under these circumstances, sensor valve 58 would remain in or shift to position 64 and pump 12 would be spring biased to its full displacement position. Although the above discussion deals only with metering flow to a single fluid actuated device, should any or all of the plungers in valve 18 be placed in an intermediate position to meter fluid to a service port, some flow would still be delivered to control pressure port 54 and thus the pump 12 would establish an equilibrium position intermediate its minimum and maximum output. It is only when at least one plunger is activated to its full operating position that the pump 12 will be biased into full displacement.

Figure 2:
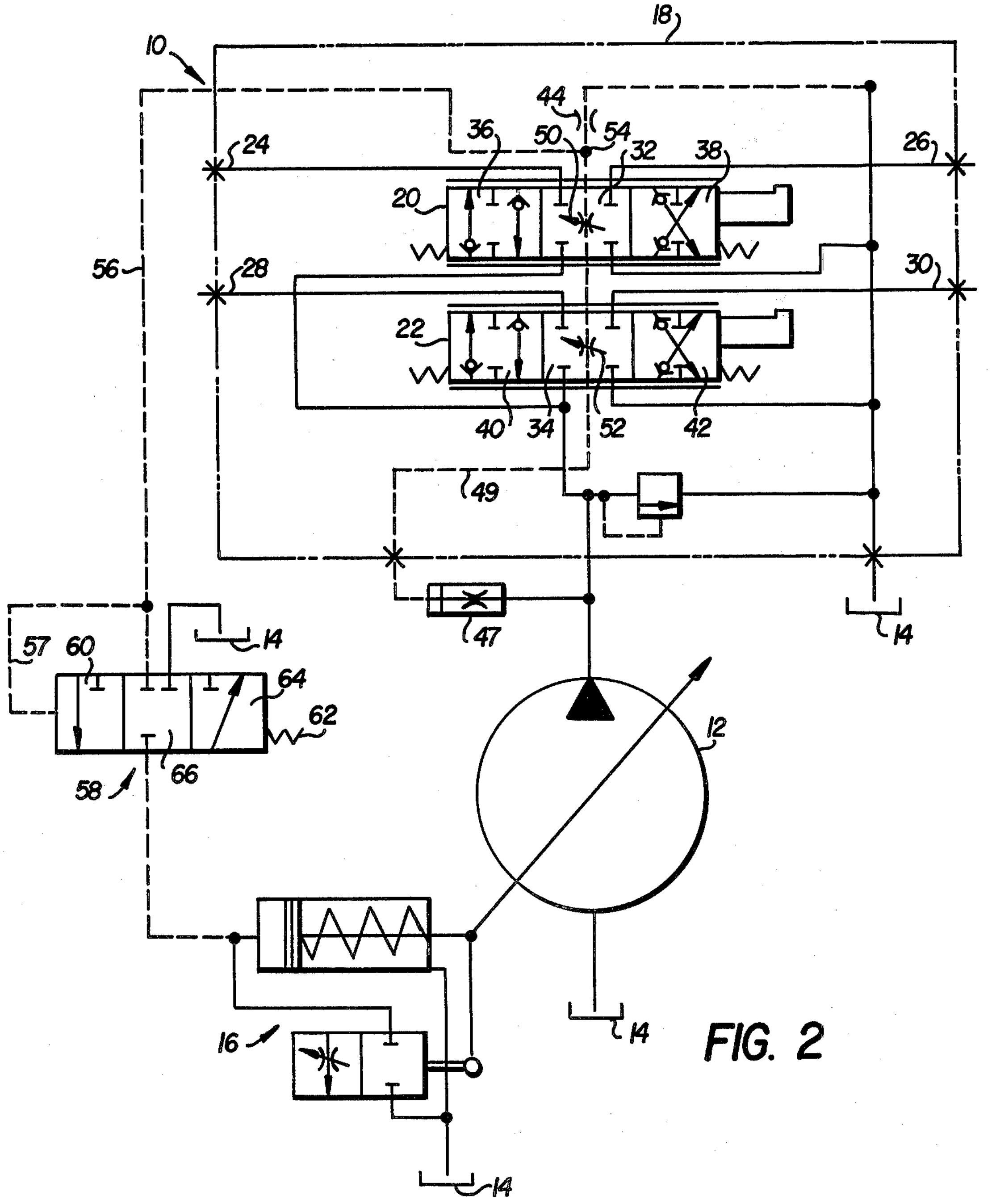
FIG. 2 is a graphic diagram of a second embodiment of the hydraulic control system of the present invention.

In FIG. 2, a further embodiment of the invention is illustrated in which constant displacement pump 46 has been replaced by a pressure compensated flow control valve 47, of known design, connected to the output of variable displacement pump 12, the output of valve 47 then passing through variable orifices 50, 52; and the output of pump 12 passing directly to spools 20, 22. Because the flow downstream of pressure compensated flow control valve 47 is substantially isolated from any flow reversals or pressure surges imposed on service ports 24, 26 and 28, 30, the control pressure signal on line 56 is responsive to the position of plungers 20, 22.

Otherwise, the structure of this embodiment of the invention is identical to that illustrated in FIG. 1.

The control systems shown in FIGS. 1 and 2 have the advantage that due to the presence of either pump 46 or flow control valve 47, a relatively constant flow of signal fluid is provided through variable restrictors 50, 52, regardless of the back pressure which may be developed at service ports 24–30. This renders the control system rather insensitive to system pressures, an improvement upon the system disclosed in my earlier patent.

Thus, it is apparent that a hydraulic control system has been provided which is capable of controlling the distribution of fluid to a plurality of fluid actuated devices in a highly efficient and responsive manner. This system is not subject to signal reversals as a result of gravitational forces acting on the fluid actuated devices since there is no feedback from the load. Additionally, the system requires the use of only a single control line to the pump. The control valve utilized in the system develops a control signal for the pump which is responsive to the position of the individual valve plungers. Furthermore, the displacement control mechanism for the pump further improves the responsiveness of the system. Since this system requires relatively simple and inexpensive modifications to existing control systems, it may be easily manufactured.

While there have been described what are at the present considered to be the preferred embodiments of the present invention, it will be obvious to those skilled in the art that various changes and modifications may be made therein, within departing from the invention, and it is, therefore, intended in the appended claims to cover all such changes and modifications as fall within the true spirit and scope of the present invention.

Having described my invention in sufficient detail to enable those skilled in the art to make and use it, I claim:

1. An improved hydraulic system, comprising:

a fluid reservoir;

a variable displacement pump having a fluid input in communication with said reservoir and having a fluid output;

fluid pressure actuated displacement control means for controlling the displacement of said pump;

a fluid actuated device;

control valve means in fluid communication with said fluid output and with said reservoir, for controlling a flow of fluid from said pump to said fluid actuated device;

means for producing a flow of signal fluid which is substantially isolated from pressure surges caused by said fluid actuated device;

means including said control valve for regulating said flow of signal fluid in response to movement of said control valve means as it controls said flow of fluid from said pump to said fluid actuated device;

sensor valve means in fluid communication with an output of said regulating means, with said displacement control means and with said reservoir, for directing to said control means a portion of said signal fluid which is isolated from pressure surges caused by said fluid actuated device in response to variations in the pressure of said signal fluid at said output, whereby flow of said signal fluid and displacement of said pump are controlled in accordance with the flow rate selected for said fluid actuated device at said control valve means but are substantially unaffected by pressure surges caused by said fluid actuated device.

2. A system according to claim 1, wherein said producing means comprises a constant displacement pump connected to said reservoir.

3. A system according to claim 1, wherein said producing means comprises a pressure compensated flow control valve connected to said fluid output.

4. A system according to claim 1, wherein said sensor valve means includes means for placing a portion of said signal fluid in communication with said displacement control means when the pressure of said signal fluid exceeds a predetermined value, to thereby decrease pump displacement, and means for placing said displacement control means in communication with said reservoir when the pressure of said signal fluid is less than said predetermined valve, to thereby increase pump displacement.

5. A system according to claim 4, wherein said sensor valve means further comprises means for blocking fluid communication among said signal fluid, said displacement control means and said reservoir when the pressure of said signal fluid equals said predetermined value, to thereby hold constant the pump displacement.

6. A system according to claim 1, wherein said control valve means comprises:

at least one service port adapted to be connected to a fluid actuated device;

a neutral position in which fluid communication between said variable displacement pump and said service port is blocked; and at least one operating position wherein the fluid output of said variable displacement pump is placed in fluid communication with said service port, wherein said regulating means comprises a fixed orifice for restricting flow between said producing means and said reservoir and wherein said control valve further includes means for restricting flow in a flow path between said producing means and said fixed orifice when said control valve is between said neutral position and said operating position, said flow restricting means providing a variable restriction in said flow path as said valve is moved from said neutral position toward said operating position.

7. A system according to claim 6, wherein said output of said regulating means comprises a control port positioned between said variable orifice and said fixed orifice for delivering a portion of said signal fluid to said sensor valve.

* * * * *